United States Patent Office 3,591,585
Patented July 6, 1971

3,591,585
PROCESS FOR MAKING DESACETOXYCEPH-
ALOSPORINS
Lowell D. Hatfield, Indianapolis, Ind., assignor to
Eli Lilly and Company, Indianapolis, Ind.
No Drawing. Filed Feb. 14, 1969, Ser. No. 799,504
Int. Cl. C07d 99/24
U.S. Cl. 260—243                                    11 Claims

ABSTRACT OF THE DISCLOSURE

Desacetoxycephalosporin esters, useful in preparing cephalosporin antibiotics, e.g., cephalexin, are prepared in improved yields by heating a penicillin sulfoxide ester dissolved in a tertiary carboxamide containing solvent in the presence of sulfonic acid while providing a means for removing or inactivating water in the reaction mixture.

This invention relates to processes for converting penicillin sulfoxide esters to desacetoxycephalosporin esters. Desacetoxycephalosporin esters are important intermediates in the process for preparing cephalosporin antibiotics, e.g., cephalexin, from penicillin starting materials. More particularly, this invention provides a process for preparing desacetoxycephalosporin esters in improved yields from penicillin sulfoxide esters.

BACKGROUND OF THE INVENTION

The semi-synthetic production of 7-acylamidodesacetoxycephalosporin antibiotics from penicillin starting materials has become of importance recently, due to the process invention of Morin and Jackson (U.S. Pat. No. 3,275,626) who describe and claim a process for converting penicillin sulfoxide esters to desacetoxycephalosporanic acid esters and to the improvements on that Morin-Jackson process by Chauvette and Flynn (U.S. application Ser. No. 574,311, filed Aug. 23, 1966, now abandoned, and replaced by application Ser. No. 708,518, filed Feb. 27, 1968) who found that certain esters of the penicillin starting materials and of the resulting desacetoxycephalosporin ester products were more useful in the process in that they were more easily cleaved than those employed by Morin and Jackson. Further improvements of the Morin-Jackson process were claimed by Robin D. G. Cooper in application Ser. No. 636,592, filed May 8, 1967 now abandoned, and replaced by application Ser. No. 838,697, filed July 2, 1969, who found that the use of certain tertiary carboxamide solvents directed the heat rearrangement of the penicillin sulfoxide esters more specifically toward production of the corresponding desacetoxycephalosporin esters and permitted the use of lower temperatures. Some of the 7-acylamidodesacetoxycephalosporanic acid compounds have been found to have unique properties as antibiotics in their own right. For example, cephalexin, 7-[D-alpha-aminophenylacetamido]-3-methyl-Δ³-cephem - 4 - carboxylic acid, zwitterion, and pharmaceutically acceptable cationic and anionic salt forms thereof, are useful as oral antibiotics in combatting infections caused, e.g., by penicillin resistant strains of Staphylococcus aureus, and many other Gram-positive and Gram-negative microorganisms.

One of the unique advantages of Δ3-desacetoxycephalosporin compounds, that is, compounds of the general formula

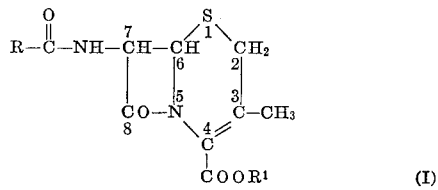

wherein R is the residue of the acylamido group in the 7-position, and $R^1$ is hydrogen, a salt forming cation, an ester group, or an anionic charge when the COO— forms a salt with a cation either within or outside of the molecule, is that such compounds can now be prepared from penicillin sulfoxide esters by the Morin-Jackson process, especially as improved by the Chauvette-Flynn and R. D. G. Cooper improvements, and as further improved by this invention. The Morin-Jackson patent and the Cooper application detail various techniques effective in converting penicillin sulfoxide esters to the corresponding desacetoxycephalosporin esters. Several chemical steps are necessary for converting a penicillin to a cephalosporin antibiotic. To make such a process economically significant, yield losses in each step must be minimized. However, to date at least, it has not been possible to produce the desired high yields of the desacetoxycephalosporin ester by the Morin-Jackson process, as improved by the Cooper solvent systems. Those in the cephalosporin antibiotic art are in need of and are looking for process conditions by which the yields of the valuable desacetoxycephalosporin esters can be produced consistently in yields greater than has previously been possible.

It is an object of this invention to provide a means for reducing yield losses in a process for converting penicillin sulfoxide esters to desacetoxycephalosporin esters.

Other objects, advantages, and aspects of this invention will become apparent from the description and claims which follow.

DETAILED DESCRIPTION OF THE INVENTION

Briefly, I have discovered that the yields of desacetoxycephalosporin esters obtained by heating a penicillin sulfoxide ester in a tertiary carboxamide containing solvent under acid conditions in a temperature range of from about 80° C. to about 150° C., can be improved by using in combination an effective amount of an acid, preferably a sulfonic acid, or a substance which forms a sulfonic acid in the mixture, such as an anhydride or sulfonic acid ester, including sultones while providing a means for removing or otherwise deactivating water found in the reaction mixture or generated by the chemical reaction during the heating operation.

I believe that the substantially improved yields which have been experienced in this improved process are due to the combination of the choice of acid conditions and to a large extent the discovery that water present in the reaction mixture, whether introduced with the solvents or reactants, atmospheric conditions or as a by-product of the reaction, should be removed as rapidly and completely as is feasible during the heating operation to improve the yield of desacetoxycephalosporin ester product. This follows from my discovery that the presence of water at the temperature of the reaction causes a degradation of the penicillin sulfoxide ester.

The preferred acid substance is a sulfonic acid, or a substance which is converted to a sulfonic acid upon heating with water media, such as a sulfonic acid anhydride, a sulfonic acid ester, or a sultone which is converted to a sulfonic acid by water in the reaction mixture. Examples of preferred sulfonic acids are the $C_1$ to $C_{12}$-hydrocarbonsulfonic acids such as the $C_1$ to $C_{12}$-alkanesulfonic acids such as methanesulfonic, ethanesulfonic, hexanesulfonic, nonanesulfonic, dodecanesulfonic acids, as well as the $C_4$ to $C_7$-cycloalkanesulfonic acids such as cyclobutanesulfonic, cyclopentanesulfonic, cyclohexanesulfonic, and cycloheptanesulfonic acid, the $C_6$ to $C_{12}$-aromatic aryl and alkaryl hydrocarbonsulfonic acids such as benzene sulfonic, dodecylbenzenesulfonic, alpha- and beta-naphthalenesulfonic, biphenylsulfonic, p-toluenesulfonic, xylenesulfonic acids, disulfonic acids such as methanedisulfonic acid, benzenedisulfonic acid, $C_6$ to $C_{12}$-aryl aminodisulfonic acids such as 2-amino-2,4-benzenedisulfonic acid, and 2-amino-1,6-naphthalenedisulfonic acid, and the like, benzenetrisulfonic acid, and mixtures of sulfonic acids, and such sulfonic acids substituted with groups that do not interfere with the penicillin sulfoxide ester rearrangement reaction, such as chlorine, bromine, nitro, cyano, and the like, exemplified by p-chlorobenzenesulfonic, 3,5-dibromobenzenesulfonic, 4-nitro-alpha-naphthalenesulfonic, and 4-cyanobenzenesulfonic acids as well as terpene-type sulfonic acids such as cymemesulfonic, menthanesulfonic, lemonenesulphonic, pinenesulfonic, camphorsulfonic acid, and bornylsulfonic acids, and the like. For economic reasons, the preferred sulfonic acids are $C_1$ to $C_6$-alkanesulfonic acids such as methanesulfonic acid, ethanesulfonic acid, and the simple $C_6$ to $C_8$ aromatic aryl and alkaryl hydrocarbon sulfonic acids such as benzenesulfonic acid, p-toluenesulfonic acid, and the like. Sulfonic acid precursors such as sulfonic acid anhydrides which may be used are exemplified by methanesulfonic anhydride, p-toluenesulfonic anhydride, and the like. Other sulfonic acid precursors such as sulfonic acids esters and sultones which may be used are exemplified by the $C_1$ to $C_3$-lower alkyl and benzyl esters of $C_1$ to $C_6$-alkanesulfonic acids and the $C_6$ to $C_8$-aryl and alkaryl sulfonic acids such as the methyl, ethyl, or propyl esters of methanesulfonic, benzenesulfonic, and p-toluenesulfonic acids, and propanesultone, butanesultone, 2,5-pentanesultone, and the like. The concentration of the acid substance will vary depending upon the nature of the acid substance, the concentration of the penicillin sulfoxide ester, the tertiary carboxamide used, the desired time of reaction etc. In general, the molar ratio of the penicillin sulfoxide ester to the acid substance can range from 1:1 to about 50:1. Preferably a molar ratio of penicillin sulfoxide ester to acid ranges from about 5:1 to about 15:1. The concentration of the penicillin sulfoxide ester in the total solvent system can vary extensively but preferably constitutes from about 1 to about 20 percent by weight of the reaction mixture.

The penicillin in sulfoxide ester in the acidified tertiary carboxamide solvent system, including means for removing water, is heated to from about 80° C. to about 150° C. to direct the rearrangement of the penicillin sulfoxide ester to the desacetoxycephalosporin ester. In the preferred tertiary caboxamide solvents, the preferred heating temperature is from about 90° C. to about 130° C. for from about 2 to about 24 hours. Lower temperatures require more time, while at higher temperatures the reaction mixture tends to produce a more complex rearrangement product.

The means for removing or inactivating water in the reaction mixture during the heating operation can be provided by chemical or physical procedures known in the art, or by combinations of both chemical and physical means, for example, by adding to the reaction mixture a drying substance which does not interfere with the desired penicillin sulfoxide ester conversion, e.g., $C_2$ to $C_6$-alkanoic acid anhydride in molar excess relative to the water present or produced in the reaction. Preferably, however, we have obtained our best yields of desacetoxycephalosporin esters when the reaction mixture includes a liquid or mixture of liquids which forms an azeotrope with water, which water containing azeotrope is distilled out of the reaction mixture during the heating operation. Numerous types of chemicals are known to form binary or ternary water-containing azeotropes having boiling points sufficient for distillation during the heating operation. Such chemicals include hydrocarbons especially $C_5$ to $C_8$-alkanes and $C_6$ to $C_8$-aromatic hydrocarbons, halogenated hydrocarbons, particularly those containing from 1 to 6 carbon atoms, and from 1 to 4 chlorine or bromine atoms, ethers, esters, organic acids, ketones, aldehydes, and the like, as set forth in various chemistry handbooks; e.g. Handbook of Chemistry, edited by N.A. Lange, ninth edition (1956), Published by Handbook Publishers, Inc., Sandusky, Ohio, pp. 1484 to 1486, and 1493, and in the Chemical Rubber Co., Handbook of Chemistry and Physics, 45th edition, pp. D–1 to D–18, (1964–65). We prefer that the liquid that is used to form a water containing azeotrope in the reaction mixture be a readily available, economical, inert organic liquid. Examples of suitable water-azeotrope forming liquids that are heavier than water which may be used include 1,2-dichloroethane, chloroform, methylene chloride, and carbon tetrachloride. Examples of suitable water-azeotrope forming liquids that are lighter than water which may be used include methyl ethyl ketone, methyl isobutyl ketone, benzene, toluene, xylene, pentane, hexane, heptane, ethyl acetate, isopropyl actate, and the like. In some cases the azeotropic liquid can readily form part of the tertiary carboxamide containing solvent system used to dissolve the pencillin sulfoxide ester. The tertiary carboxamide should constitute at least about 10 percent by volume of the reaction mixture. The water-azeotrope forming substances can form the remainder of the solvent system. However, it is not necessary that the azeotrope forming liquid form a large part of the solvent system. The water containing azeotrope vapors can be condensed and collected in known types of chemical equipment, and the azeotrope forming substances can be returned to the reaction mixture, preferably after being totally dried by some physical or chemical means, for additional water azeotrope formation, or additional dry azeotrope-forming liquid can be added to replace the water-containing azeotrope which is removed by distillation. Regardless of whether a water-inactivating chemical is added to the reaction mixture, use of the azeotropic distillation procedure appears to enhance the yield of the desacetoxycephalosporin ester product. It is contemplated that chemical and physical drying means can be used in combination to hasten water removal from the reaction mixture.

The water containing azeotrope liquids can be collected and condensed in known types of chemical equipment including the usual Dean-Stark trap, and Barrett types of water traps and dried, if desired, for recycle of the top layer (azeotropic liquid) or other types of equipment such as is disclosed in Analytical Chemistry, 29, p. 100 (1957), and in Ind. Eng. Chem., Anal. ed., 8, p. 314 (1936), for recycle of the lower layer, that is, when the water-azeotrope forming liquid has a density greater than water, water forms a top layer as it separates, and the heavier azeotropic liquid returns to the reaction vessel to be recycled. Commercial scale equipment operating on similar water removal principles can be used. It should also be noted that water can be dried from the distillate by filtration through a column packed with a suitable drying agent such as anhydrous sodium sulfate, magnesium sulfate, calcium carbide, calcium chloride, molecular sieves, particularly types 3A and 4A, and the like. The dried azeotrope forming liquid can then be returned to the reaction mixture.

The general types of tertiary carboxamides which can be used have the structural formula

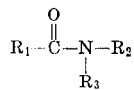

wherein (1) $R_1$ is hydrogen, and each of $R_2$ and $R_3$ is alkyl, phenyl, tolyl, or xylyl such that $R_2$ and $R_3$ together contain up to about 14 carbon atoms;

(2) at least one of $R_1$, $R_2$, and $R_3$ is alkyl, and not more than two of $R_1$, $R_2$, and $R_3$ are phenyl, tolyl, xylyl, and $R_1$, $R_2$, and $R_3$ together contain up to about 18 carbon atoms;

(3) $R_1$ is hydrogen or alkyl, $R_2$ and $R_3$ are taken together with the nitrogen to which they are bonded to form a saturated monocyclic ring which contains from 4 to 6 carbon atoms in the ring, which ring can also contain an oxygen ring member, gamma to the ring nitrogen, and $R_1$, $R_2$, and $R_3$ together contain not more than 12 carbon atoms; and/or (4) $R_1$ and $R_2$ are taken together with the amide grouping

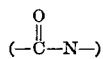

to which they are bonded to form a saturated carbonyl-containing monocyclic ring having from 4 to 6 ring carbon atoms, $R_3$ is alkyl, phenyl, tolyl, or xylyl, and $R_1$, $R_2$, and $R_3$ together contain not more than 14 carbon atoms.

Examples of tertiary carboxamides of the types described above, which may be used in the process include:

(1) N,N-dimethylformamide (DMF),

N,N-diethylformamide,
N,N-diisopropylformamide,
N,N-dibutylformamide,
N,N-dipentylformamide,
N-methyl-N-ethylformamide,
N-methyl-N-phenylformamide,
N-ethyl-N-(m-tolyl)formamide,
N-propyl-N-(3,5-dimethylphenyl),
N,N-diphenylformamide,
N,N-bis(4-methylphenyl)formamide,
N-(3,5-dimethyl)-N-methylformamide,
N,N-bis(2,4-dimethylphenyl)formamide, and the like;

(2) N,N-dimethylacetamide (DMA),

N,N-diethylacetamide,
N,N-diisopropylacetamide,
N,N-dibutylacetamide,
N,N-di-tert-butylacetamide,
N,N-dimethylpropionamide,
N,N-diethylpropionamide,
N,N,-dipentylpropionamide,
N,N-dimethylbutanoamide,
N,N-diethylbutanoamide,
N,N-dimethyldecanoamide,
N,N-dimethylbenzamide,
N,N-diethylbenzoamide,
N,N-dipropyl-m-toluamide,
N,N-dibutyl-p-toluamide,
N-phenyl-N-methylacetamide,
N-(p-tolyl)-N-ethylacetamide,
N-(3,5-dimethylphenyl)-N-methylpropionamide,
N,N-dimethyl-3,5-dimethylbenzoamide,
N,N-dibutyl-4-ethylbenzoamide,
N,N-diphenylacetamide,
N-(3-methylphenyl)-N-ethylbenzoamide,
N,N-bis(6-methylphenyl)propionamide,
N,N-bis(3,5-dimethylphenyl)propionamide, and the like;

(3) N-formylpiperidine,

N-acetylpyrrolidine,
N-propionylmorpholine,
N-acetyl-4,5-dimethylpyrrolidine,
N-butanoylpiperidine,
N-acetyl-6-methylpiperidine, and the like; and (4) 1-methyl-2-pyrrolidone, 1-phenyl-2-pyrrolidone,
1-butyl-2-piperidone,
1-pentyl-2-piperidone,
1-(m-tolyl)-2-piperidone,
1-ethyl-2-piperidone,
1-(3,5-dimethylphenyl)-2-piperidone,
1-methyl-2-piperidone,
1-phenyl-2-piperidone,
1-propyl-2-piperidone,
1-isopropyl-2-pyrrolidone,
1-(3-methylphenyl)-2-pyrrolidone,
N-methyl-2-homopiperidone,
N-ethyl-2-homopiperidone.

However, we especially prefer to use dimethylacetamide, dimethylformamide, or N-methyl-2-pyrrolidone in this heating step.

The process of the present invention, like the processes as to which it is an improvement, is broadly applicable to the conversion of the prior-art penicillins, so long as they are not otherwise converted under the conditions of acidity and elevated temperature employed. In all cases, they must be esterified and must be converted into the corresponding sulfoxide prior to treatment. A wide range of penicillins can be effectively treated in accordance with the invention, including benzyl penicillin, n-heptyl penicillin, phenylmercaptomethyl penicillin, and the like. The preferred penicillins are phenoxymethyl penicillin ("penicillin-V"), phenylacetyl penicillin (penicillin G), and p-methoxyphenoxymethyl pencillin. Penicillin nucleus (6-aminopenicillanic acid)—"6-APA"—can also be treated successfully, but the 6-amino group should first be protected with an easily removable group, such as allyloxycarbonyl, tert-butoxycarbonyl, or the like. The product obtained by treatment of the N-protected or blocked 6-APA sulfoxide is the corresponding N-protected 7-aminodesacetoxycephalosporanic acid ("7-ADCA") ester, which, after cleavage of the N-protecting group, can be acylated in a known manner to produce the desired desacetoxycephalosporin in the form of the ester. The ester group can be cleaved before or after acylation, as desired. For example, the 2,2,2-trichloroethyl 7-aminodesacetoxycephalosporanate ester (7-ADCA ester) prepared by the heat conversion of 2,2,2-trichloroethyl 6-aminopenicillanate sulfoxide ester (6-APA sulfoxide ester) by the improved method of this invention, can be acylated with 2-(2-thiophene)acetyl chloride to form the 2,2,2-trichloroethyl 7-(2-thiopheneacetamido)desacetoxycephalosporanate ester, which ester can be treated with acetic acid and zinc dust by known methods to remove the 2,2,2-trichloroethyl ester group and to form 7-(2-thiopheneacetamido)desacetoxycephalosporanic acid, a known antibiotic.

However, it is preferred to apply the process improvement of this invention to the direct conversion of a penicillin sulfoxide ester (a 6-acylated penam sulfoxide ester) to the desired corresponding desacetoxycephalosporin ester. In this preferred procedure, a penicillin which has an acylamido group in the 6 position of the penicillin nucleus, is treated with an oxidizing agent to convert the penicillin thiazolidine sulfur to the sulfoxide oxidation state, and with an esterifying agent to protect the penicillin carboxyl group with an ester group which can be cleaved after the reaction in the manner described by Chauvette and Flynn, supra, or in my prior application, Ser. No. 692,678, filed Dec. 22, 1967, either before or after forming the sulfoxide. Examples of easily cleaved ester groups which can be used in the penicillin sulfoxide ester starting materials include 2,2,2-trichloroethyl, 2,2-dichloroethyl, p-methoxybenzyl, p-nitrobenzyl, 3,5 - dimethoxybenzhydryl, 4,4-dimethoxybenzhydryl, benzhydryl, phthalimidomethyl, succinimidomethyl, $C_4$ to $C_6$-tert-alkyl such as tert-butyl, tert-pentyl, and tert-hexyl, $C_5$ to $C_7$-tert-alkenyl and $C_5$ to $C_7$-tert-alkynyl such as 1,1-dimethyl-2-propenyl, 1,1-dimethyl-2-butenyl, 1,1-dimethyl-2-pentenyl, 1,1-dimethyl-2-propynyl, 1,1-dimethyl-2-butynyl, 1,1-dimethyl-2-pentynyl, and the like.

The penicillin sulfoxide ester is dissolved, with the aid of heat if necessary, in the solvent containing at least about 10 percent by volume of the selected tertiary carboxamide. If desired, the penicillin sulfoxide ester can be added to a refluxing mixture of solvent, such as dimethylacetamide, methanesulfonic acid, and benzene or other azeotrope-forming liquid over a period of time. The process can be conducted on a batch or continuous basis.

Examples of substances which can be included in the solvent system for chemically reacting with, or physically absorbing, the water introduced in the reaction system with the solvent and diluting reagents, and with the water produced during the heat rearrangement reaction include the alkanoic acid anhydrides having from 2 to 6 carbon atoms in each acid moiety such as acetic anhydride, propionic anhydride, n-butanoic anhydride, pentanoic anhydride, hexanoic anhydride, and mixed anhydrides of $C_2$ to $C_6$-alkanoic acids, cyclic saturated dibasic acid anhydrides such as succinic anhydride, glutaric anhydride, as well as economical aromatic dibasic acid anhydrides such as phthalic acid anhydride, and the like. For reasons of availability, cost and generally better results, acetic anhydride and phthalic anhydride are preferred if this is the means selected for inactivating the water in the reaction mixture. Other water-removing chemicals include acetylenedicarboxylic acid esters such as dimethyl acetylenedicarboxylate, diethyl acetylenedicarboxylate, 2,2-dimethoxypropane, and the like. Volatile substances generated by water takeup by some of these chemicals such as acetic acid (from acetic anhydride) and methanol and acetone (from 2,2-dimethoxypropane) can also be removed by azeotropic distillation during the heating operation.

To place the process of this invention in perspective with the overall process used to convert a penicillin starting material to a cephalosporin antibiotic, the following sequence is given as an example, using penicillin V as the starting penicillin and phenylglycine as the source of the acyl group in a process for making cephalexin, a known antibiotic.

(a) Protect the amino group on D-α-phenylglycine with an amino protecting group. For example, react the sodium salt of phenylglycine with methyl acetoacetate to form the N-blocked phenylglycine derivative, sodium 3-(D-α-carboxybenzylamino)-crotonate. Another suitable amino protecting group for use in this process is the tert-butoxycarbonyl group.

(b) Form the mixed anhydride of the N-blocked phenylglycine derivative from step (a), e.g., by reacting the sodium 3-(D-α-carboxybenzylamino)crotonate with methyl chloroformate in the presence of a tertiary amine to form the methyl mixed anhydride of the N-blocked phenylglycine derivative.

(c) Prepare the sulfoxide of the penicillin V by reacting the penicillin V or a salt thereof with sodium metaperiodate or hydrogen peroxide or other equivalent oxidizing agent to form the 6-(phenoxyacetamido)-2,2-dimethyl-penam-4-carboxylic acid-1-oxide.

(d) Form an ester of penicillin V sulfoxide by mixing a salt of penicillin V such as an alkali metal (sodium or potassium), pyridinium, or triethylammonium salt thereof with an alcohol, and adding phosgene thereto. A typical alcohol is p-nitrobenzyl alcohol to form the p-nitrobenzyl ester of penicillin V (sulfoxide [p-nitrobenzyl-6-phenoxyacetamido-2,2-dimethylpenam-3-carboxylate-1-oxide].

(e) Dissolve the penicillin sulfoxide ester from step (d) in tertiary carboxamide solvent medium together with the sulfonic acid and acetic anhydride or other equivalent water inactivating substance or with a water-azeotrope forming liquid to obtain an acidified tertiary carboxamide liquid solution of the p-nitrobenzyl penicillin V sulfoxide ester.

(f) Heat the penicillin sulfoxide ester solution from step (e) in the acidified tertiary carboxamide liquid medium to from about 80° C. to about 150° C. to form desacetoxycephalosporin ester [p-nitrobenzyl - 7 - phenoxyacetamido-3-methyl-3-cephem-4-carboxylate] while removing water from the reaction by chemical or physical means.

(g) Cleave the 7-phenoxyacetyl group from the p-nitrobenzyl-7-phenoxyacetamido - 3 - methyl - $\Delta^3$ - cephem-4-carboxylate ester product by methods now known, e.g., by reacting the product of step (f) with phosphorus pentachloride in the presence of a substantially equimolar quantity of pyridine, followed by treatment with methanol, and water as described by Chauvette application Ser. No. 651,662, filed July 7, 1967, to form the p-nitrobenzyl 7-amino-3-methyl-$\Delta^3$-cephem-4-carboxylate nuclear ester.

(h) Acylate the nucleus from step (g) with a mixed anhydride of the N-protected phenylglycine from step (b) to form the p-nitrobenzyl 7-(N-protected phenylglycylamido)-3-methyl-3-cephem-4-carboxylate ester.

(i) Remove the p-nitrobenzyl ester group on the product from step (h) by known methods, e.g., by hydrogenation of the ester product in the presence of a hydrogenation catalyst such as palladium or rhodium on a carrier such as carbon, barium sulfate, or alumina or a compound of such metal suspended in the ester-hydrogenation medium.

(j) Remove the amino-blocking group from the product from step (i) by treating the acid product from step (i) with an acid, such as formic or hydrochloric acid, adjust the pH of the product to form the 7-[D-α-amino-α-phenylacetamido]-3-methyl-$\Delta^3$-cephem-4-carboxylic acid, as the zwitterion, if desired, or as a salt with any pharmaceutically acceptable cation or anion, such as the sodium or potassium cations, the hydrochloride, sulfate, phosphate, nitrate, hydrobromide anions or with water as a hydrate of the zwitterion. This compound, now known generally as cephalexin, is an effective orally administable antibiotic. A common dosage contemplated for this antibiotic is in 250 and 500 mg. capsules or tablets.

The penicillin sulfoxide ester starting material and desacetoxycephalosporanic acid products of the process of this invention have sometimes been named using the penam nomenclature for the penicillins as described by Sheehan, Henery-Logan, and Johnson in the J. Am. Chem. Soc., 75, p. 3293, footnote 2 (1953), and which nomenclature has been adapted to the cephalosporins by Morin, Jackson, Flynn, and Roeske in the J. Am. Chem. Soc., 84, p. 3400 (1962). In accordance with these systems of nomenclature, "penam" and "cepham" refer respectively to the following saturated ring structures:

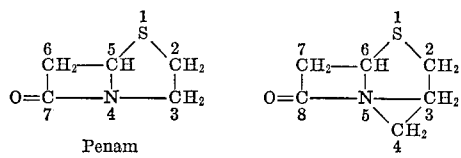

"Cephem" refers to the cepham ring structure with a double bond, the position of which is indicated by a prefix number denoting the carbon atom of the lowest number to which the double bond is connected. By this system of nomenclature, 6-aminopenicillanic acid (6-APA) is named 6-amino-2,2-dimethylpenam-3-carboxylic acid. 7-aminocephalosphoranic acid (7-ACA) is named 7-amino-3-acetoxymethyl-3-cephem-4-carboxylic acid.

The prior art describes literally thousands of penicillin compounds which can be converted to desacetoxycephalosporin compounds by the improved process of this invention. A few typical examples will illustrate, to those familiar with the art, penicillins which may be used as starting materials, and the desacetoxycephalosporins obtained therefrom. The desacetoxycephalosporin compounds produced by the process of this invention from the corresponding penicillin sulfoxide esters, are useful especially after ester group removal as antibiotics in therapy treatment of diseases caused by various Gram-positive and Gram-negative microorganisms. 7-aminodesacetoxycephalosporanic acid (7-ADCA), produced from a corresponding 6-amino penicillanate sulfoxide ester by this invention, is useful as an intermediate to prepare desacetoxycephalosporin antibiotic substances. For example, 7-ADCA can be acylated with 2-thiopheneacetyl chloride to obtain 7-(7 - thiopheneacetamido)-3-methyl-3-cephem-4-carboxylic acid, a known antibiotic.

The esterified penicillin sulfoxides listed below yield the indicated corresponding desacetoxycephalosporins after heat rearrangement of the penicillin sulfoxide esters according to the method of this invention and removal of the ester group by conventional methods.

6-[2'-methoxy-2'-(2''-thienyl)acetamido]-2,2-dimethylpenam-3-carboxylic acid to obtain 7-[2'-methoxy-2'-(2''-thienyl)-acetamido]-3-methyl-3-cephem-4-carboxylic acid.

6 - (phenylacetamido)-2,2-dimethylpenam-3-carboxylic acid to obtain 7-(phenylacetamido)-3-methyl-3-cephem-4-carboxylic acid.

6-(thiophene-2-acetamido) - 2,2 - dimethylpenam-3-carboxylic acid to obtain 7-(thiophene-2-acetamido)-3-methyl-3-cephem-4-carboxylic acid.

6-(phenylmercaptoacetamido) - 2,2 - dimethylpenam-3-carboxylic acid to obtain 7-(phenylmercaptoacetamido)-3-methyl-3-cephem-4-carboxylic acid.

6-(2' - furylacetamido)-2,2-dimethylpenam-3-carboxylic acid to obtain 7-(2'-furylacetamido)-3-methyl-3-cephem-4-carboxylic acid.

6-(2'-protected amino-2'-phenylacetamido)-2,2-dimethylpenam-3-carboxylic acid to obtain 7-(2'-protected amino-2'-phenylacetamido)-3-methyl - 3 - cephem-4-carboxylic acid.

6-(butylmercaptoacetamido) - 2,2 - dimethylpenam-3-carboxylic acid to obtain 7-(butylmercaptoacetamido)-3-methyl-3-cephem-4-carboxylic acid.

6 - (heptylamido)-2,2-dimethylpenam-3-carboxylic acid to obtain 7-(heptylamido)-3-methyl-3-cephem-4-carboxylic acid.

6-benzoyl-2,2-dimethylpenam-3-carboxylic acid to obtain 7-benzoyl-3-methyl-3-cephem-4-carboxylic acid.

The invention is further illustrated by the following detailed examples.

EXAMPLE 1

This example compares and illustrates the effects and advantages of the combined use of a sulfonic acid and anhydride versus the separate use of the anhydride or the sulfonic acid in this ring expansion process.

A solution of 15 g. (0.03 mole) of p-nitrobenzyl penicillin V sulfoxide ester in 150 ml. of dry, N,N-dimethylacetamide was divided into three equal portions, labeled A, B, and C and placed in 250 ml. round-bottomed flasks.

Portion A was treated with 1.2 ml. (0.012 mole) of acetic anhydride. This quantity of acetic anhydride is believed to be about the optimum for the best yields of the desacetoxycephalosporin ester product using this reagent alone.

Portion B was treated with 0.13 g. of methanesulfonic acid. This proportion of acid is also believed to be the optimum amount to use for best yields of product using this acid alone.

Portion C was treated with 1.2 ml. of acetic anhydride plus 0.13 g. of methanesulfonic acid.

Each of the three flasks A, B, and C, so treated, was fitted with a condenser and drying tube, and the three flasks were immersed side by side in an oil bath at 100° C. for 12 hours. Each solution—A, B, and C—was then processed by vacuum distillation of the solvent to a residue weight of 8.5 g. and the p-nitrobenzy 7-phenoxyacetamido-3-methyl-Δ³-cephem-4-carboxylate ester product was crystallized from the residue by treatment thereof with 50 ml. of a 1:1 v./v. isopropanol/ethyl ether mixture and washed and vacuum dried at 50° C. The yields of product from the three runs were as follows:

| Portion: | Wt. (gm.) | Percent yield | Melting point, ° C. |
| --- | --- | --- | --- |
| A | 0.75 | 16 | 177–18 |
| B | 1.81 | 37 | 187–18 |
| C | 3.00 | 62 | 186.5–188 |

Each product was identified with aid of thin layer chromatography and infrared (IR) and nuclear magnetic resonance (NMR) spectra. The melting point for the pure product is said to be 189–191° C.

EXAMPLE 2

A solution containing 5.0 g. (0.010 M.) of penicillin V sulfoxide, p-nitrobenzyl ester, 0.05 ml. of methanesulfonic acid, 1.2 ml. of 2,2-dimethoxypropane, and 50 ml. of dry N,N-dimethylacetamide was added to a 200 ml. round bottomed flask equipped with an air condenser and "Drierite" drying tube. The solution was immersed in an oil bath at 100° C. for 12 hours. The red solution was concentrated under vacuum at 60–65° C. to a residue weight of 10.0 g. Crystallization from 50 ml. of 1/1 isopropanol/ether gave 2.51 g. (52.2 percent yield) of p-nitrobenzyl 7-(α-phenoxyacetamide) - 3 - methyl-3-cephem-4-carboxylate, M.P. 186–188° C.

EXAMPLE 3

A 300 ml. round-bottomed, three-necked flask was equipped with a mechanical stirrer, heating mantle, thermometer, and Dean-Stark water trap. The latter was connected to a condenser to which was attached a "Drierite" drying tube. The flask was charged with 10.0 g. (0.02 M) of penicillin V sulfoxide, p-nitrobenzy ester, 80 ml. of dry benzene, 60 ml. of dry N,N-dimethylacetamide, and 0.12 ml. of methanesulfonic acid. The Dean-Stark trap was filled with dry benzene. The resulting mixture was refluxed 12 hours. Approximately 0.4 ml. of water collected in the trap. Thin layer chromotagraphy (silica gel/isoamyl acetate) showed only one major component. The red solution was concentrated under vacuum at 60–65° C. to a residue weight of 17.5 g. Crystallization from 100 ml. of 1/1 isopropanol/ether gave 7.08 g. (73.3 percent yield) of p-nitrobenzyl 7 - (α - phenoxyacetamide) - 3-methyl - 3 - cephem-4-carboxylate as a very light cream colored solid, M.P. 188–190° C. The infrared and nuclear magnetic resonance spectra were identical with a known sample of the pure ester.

EXAMPLE 4

The procedure of Example 3 was repeated except that 2.0 g. (0.016 mole) of 1,3-propanesultone was used instead of methanesulfonic acid. Approximately 0.4 ml. of water was collected in the water trap. The yield of p-nitrobenzyl 7 - (α - phenoxyacetamido) - 3 - methyl - 3-cephem-4-carboxylate was 6.83 g. (70.8 percent), M.P. 183–187° C.

EXAMPLE 5

The procedure of Example 3 was repeated except that 0.2 g. of methanesulfonic anhydride was used in place of the methanesulfonic acid. Approximately 0.4 ml. of water was collected in the trap. The yield of p-nitrobenzyl 7-(α-phenoxyacetamido) - 3 - methyl - 3 - cephem - 4 - carboxylate was 6.83 g. (70.8 percent), M.P. 186–188° C.

EXAMPLE 6

A 300 ml., round-bottomed, three-necked flask was equipped with a mechanical stirrer, heating mantle, thermometer, and a Soxhlet extractor. The extractor contained a coarse disc rather than the usual siphon tube so that solvent could run directly back into the reaction flask. The flask was charged with 5.0 g. (0.01 M) of penicillin V sulfoxide, p-nitrobenzyl ester, 0.07 ml. of methanesulfonic acid, 75 ml. of 1,2-dichloroethane, and 25 ml. of dry N,N-dimethylacetamide. Anhydrous sodium sulfate, 15 g., was placed in the Soxhlet extractor. The solution was refluxed 16 hours while drying the distillate and returning the 1,2-dichlorethane to the reaction flask. The mixture was then concentrated under vacuum at 60–65° C. to a residue weight of 8.6 g. Crystallization from 50 ml. of 1/1 isopropanol/ether gave 2.44 g. (50.5 percent yield) of p-nitrobenzyl 7-($\alpha$-penoxyacetamide)-3-methyl-3-cephem-4-carboxylate as a very light pink solid, M.P. 185.5–188° C.

EXAMPLE 7

In a run substantially similar to Example 6, but involving the use of a moisture trap for solvents heavier than water and the above solvent system, the yield of p-nitrobenzyl 7 - ($\alpha$ - phenoxyacetamido) - 3 - methyl - 3-cephem-4-carboxylate was 64.4 percent.

EXAMPLE 8

The procedure of Example 6 was substantially duplicated except that benzene was used as the azeotrope forming liquid and 20 g. of anhydrous calcium chloride ("Pelidow" of the Dow Chemical Company) was used instead of anhydrous sodium sulfate to dry the benzene-water azeotrope. The yield of p-nitrobenzyl 7-($\alpha$-phenoxyacetamido)-3-methyl-3-cephem-4-carboxylate was 3.74 g. (77.7 percent) M.P. 184–196.5° C.

magnesium sulfate. The solution was filtered from drying agent, diluted to 150 ml. with dry benzene, and added to a 500 ml., round-bottomed, three-necked flask equipped with a mechanical stirrer, heating mantle, air condenser with "Drierite" drying tube, and a thermometer. To the stirred solution was added 4.61 g. of phosphorous pentachloride followed by 1.61 ml. of dry pyridine. The mixture was heated at 55–57° C. for one hour. Vacuum was carefully applied through the air condenser to lower the temperature to 0° C. and 200 ml. of cold, absolute methanol was added. The deep red solution was allowed to stand 16 hours at room temperature and vacuum was again applied to lower the temperature to 5° C. Water, 150 ml., was added and most of the organic solvent weer evaporated under vacuum at 5–15° C. The resulting mixture was treated with 100 ml. of ethyl acetate and the pH of the aqueous phase was adjusted to 6.80 by addition of 1 N sodium hydroxide solution. The two layers were separated and the aqueous layer was extracted with an additional 50 ml. of ethyl acetate. The combined organic layers were washed with two 50 ml. portions of cold water and then dried briefly over anhydrous magnesium sulfate. Addition of 4.0 g. of p-toluenesulfonic acid, monohydrate resulted in crystallization of 5.16 g. (49.8 percent yield) of 2,2,2,-trichloroethyl 7 - amino-3-methyl-3-cephem-4-carboxylate, p-toluenesulfonic acid salt as a very light yellow solid, M.P. 181–183° C. with decomposition. The infrared, ultraviolet, and nuclear magnetic resonance spectra were identical with a known sample of the same compound.

This nucleus ester salt is useful directly in the process for making cephalexin and similar cephalosporin antibiotics.

In summary, the yield improvements of this invention are demonstrated by the following table:

| Example | Solvent | Acid | Method of removing water | Percent yield |
|---|---|---|---|---|
| 1B | DMAC | CH$_3$SO$_3$H | None | 37.0 |
| 1A | DMAC | Ac$_2$O | None except reagent itself | 16.0 |
| 1C | DMAC | CH$_3$SO$_3$H | Addition of acetic anhydride | 64.7 |
| 2 | DMAC | Same | Addition of 2,2-dimethoxypropane | 52.2 |
| 3 | DMAC-benzene | do | Azeotropic distillation with benzene | 73.3 |
| 6 | DMAC-1,2-dichloroethane | do | Azeotropic distillation with 1,2-dichloroethane | 64.4 |
| 8 | DMAC-benzene | do | Azeotropic distillation with benzene and drying of the returning azeotroping solvent with anhydrous calcium chloride. | 77.7 |

EXAMPLE 9

A 300 ml. round-bottomed, three-necked flask equipped with a mechanical stirrer, thermometer, and condenser to which was added a "Drierite" brand of anhydrous calcium sulfate filled drying tube was charged with 5.0 g. (0.010 M) of penicillin V sulfoxide, p-nitrobenzyl ester, 0.05 ml. of methanesulfonic acid, 25 ml. of dry N,N-dimethylacetamide, 50 ml. of 1,2-dichloroethane, and 1.2 ml. (ca. 0.012 M) of acetic anhydride. The solution was refluxed 12 hours and then concentrated under vacuum. Crystallization of the residue from methanol gave 2.37 g. (49.0 percent yield) of p-nitrobenzyl 7-($\alpha$-phenoxyacetamide)-3-methyl-3-cephem-4-carboxylate as a cream colored solid, M.P. 188–189.5° C.

EXAMPLE 10

Combination of rearrangement and side-chain cleavage wihtout isolation of the intermediate desacetoxycephalosporin ester.

The rearrangement of 10.0 g. (0.02 M) of penicillin V sulfoxide, 2,2,2-trichloroethyl ester was conducted substantially as described in Example 3 for the p-nitrobenzyl ester. The red colored reaction mixture was cooled to room temperature, 50 ml. of benzene was added, and the solution was washed with three 50 ml. portions of cold 1 N hydrochloric acid, two 50 ml. portions of 2.5 percent sodium bicarbonate solution, and 50 ml. of 2 percent sodium chloride solution, and then dried over anhydrous Examples 1B and 1A represent the method of Morin-Jackson as improved by Cooper while Examples 2, 3, 6, and 8 show that the yield of desacetoxycephalosporin ester product is improved substantially by the combined use of acid with chemical and/or physical water removal methods.

Although the invention has been illustrated in the detailed examples using penicillin V (phenoxymethyl penicillin) sulfoxide esters, the invention is not limited thereto. This one penicillin was selected so that the percentage yield figures would be comparable. Improved yields of desacetoxycephalosporin esters can also be demonstrated with other commonly available penicillin starting materials, after conversion thereof to the corresponding penicillin sulfoxide esters.

I claim:

1. In a process for converting a penicillin sulfoxide ester to a desacetoxycephalosporin ester by heating the penicillin sulfoxide ester dissolved in a tertiary carboxamide containing solvent under acid conditions in a temperature range of from about 80° C. to about 150° C., the improvement which comprises using in combination (1) a sulfonic acid, or a substance which forms a sulfonic acid in the mixture to provide the acid in a molar ratio of penicillin sulfoxide ester to acid range of from 1:1 to about 50:1, while (2) providing a means for removing or inactivating water in the reaction mixture during the heating operation.

2. A process improvement as defined in claim 1 wherein (1) the acid is a $C_1$ to $C_6$-alkanesulfonic acid, and (2) water is removed from the reaction mixture by distillation thereof as a water-containing azeotrope within the temperature range.

3. A process as defined in claim 2 wherein (1) methanesulfonic acid is used to provide the acid conditions, and (2) water in the reaction mixture is removed as an azeotrope with a $C_6$ to $C_8$-aromatic hydrocarbon.

4. A process as defined in claim 2 wherein (1) methanesulfonic acid is used to provide the acid conditions, and (2) the water in the reaction mixture is removed as an azeotrope with a halogenated hydrocarbon having from 1 to 6 carbon atoms and from 1 to 4 chlorine or bromine atoms.

5. A process as defined in claim 1 wherein (1) the acid is a $C_1$ to $C_6$-alkanesulfonic acid and (2) the water is inactivated in the reaction mixture by the addition to the reaction mixture of an acid anhydride of a $C_2$ to 6-alkanoic acid, in molar excess relative to the amount of water present or produced therein.

6. A process improvement as defined in claim 3 wherein a phenoxymethylpenicillin sulfoxide ester dissolved in a N,N-dimethylacetamide-containing solvent is heated at from about 80° to about 150° C. (1) in the presence an effective amount of methanesulfonic acid while (2) removing water from the reaction mixture by azeotropic distillation with benzene to form as product of this process a phenoxymethyl desacetoxycephalosporin ester.

7. In a process for converting a penicillin sulfoxide ester to a desacetoxycephalosporin ester by heating the penicillin sulfoxide ester dissolved in a tertiary carboxamide containing solvent under acid conditions in a temperature range of from about 80° C. to about 150° C., the improvement which comprises (1) incorporating into the reaction mixture an inert liquid which forms an azeotrope with water during the heating operation, and (2) distilling the water-containing azeotrope from the reaction mixture.

8. A process as defined in claim 7 wherein the inert liquid which forms an azeotrope with water is a $C_5$ to $C_8$-hydrocarbon.

9. A process as defined in claim 8 wherein the inert liquid which forms an azeotrope with water is benzene.

10. A process as defined in claim 7 wherein the inert liquid which forms an azeotrope with water is a haloalkane having from 1 to 6 carbon atoms and from 1 to 4 chlorine or bromine atoms.

11. A process as defined in claim 7 wherein the water-containing azeotrope is contacted with a drying agent before returning the azeotrope forming liquid to the reaction mixture.

References Cited
UNITED STATES PATENTS 3,279,626    9/1966    Morin et al. _____ 260—243e NICHOLAS S. RIZZO, Primary Examiner U.S. Cl. X.R.

424—246; 260—239.1